(12) United States Patent
Martinez

(10) Patent No.: US 7,142,190 B2
(45) Date of Patent: Nov. 28, 2006

(54) CELLULAR COMMUNICATION HANDSETS HAVING VARIABLE APPEARANCE HOUSINGS AND METHODS THEREFOR

(75) Inventor: Nelson F. Martinez, San Diego, CA (US)

(73) Assignee: Motorola, Inc., Schamburg, IL (US)

( * ) Notice: Subject to any disclaimer, the term of this patent is extended or adjusted under 35 U.S.C. 154(b) by 637 days.

(21) Appl. No.: 10/084,965

(22) Filed: Feb. 28, 2002

(65) Prior Publication Data

US 2003/0160741 A1 Aug. 28, 2003

(51) Int. Cl.
*G09G 3/34* (2006.01)

(52) U.S. Cl. .......................... 345/106; 345/105; 345/49

(58) Field of Classification Search ................ 345/49, 345/105, 106; 359/265–274; 348/817; 455/90
See application file for complete search history.

(56) References Cited

U.S. PATENT DOCUMENTS

| | | | | |
|---|---|---|---|---|
| 4,917,643 A | * | 4/1990 | Hippely et al. | 446/14 |
| 5,042,923 A | * | 8/1991 | Wolf et al. | 359/275 |
| 5,085,607 A | * | 2/1992 | Shibahashi et al. | 446/14 |
| 5,530,581 A | * | 6/1996 | Cogan | 359/265 |
| 5,838,483 A | * | 11/1998 | Teowee et al. | 359/265 |
| 5,849,046 A | * | 12/1998 | Bailey | 29/623.5 |
| 6,246,505 B1 | * | 6/2001 | Teowee et al. | 359/265 |
| 6,466,299 B1 | * | 10/2002 | Lehtiniemi et al. | 349/199 |
| 6,535,126 B1 | * | 3/2003 | Lin et al. | 340/550 |
| 6,614,577 B1 | * | 9/2003 | Yu et al. | 359/265 |
| 2002/0021481 A1 | * | 2/2002 | Lin et al. | 359/265 |
| 2002/0075135 A1 | * | 6/2002 | Bown | 340/384.1 |
| 2002/0190975 A1 | * | 12/2002 | Kerr | 345/211 |
| 2003/0147527 A1 | * | 8/2003 | Mulligan et al. | 379/433.01 |

OTHER PUBLICATIONS

Nelson F. Martinez, "Proposed Application Of Electrochromic Polymer To Incorporate Into Wireless Communication Device Housings" Apr. 12, 2000, one page.*
"Electrochromic Materials and Systems", http://www.techfak.uni-kiel.de/matwis/ionic/topics/ec.htm, Apr. 7, 2000, one page.
"Conducting Polymers and Electrochromic Devices", http://web.chem..ufl.edu/~polymer/Reynolds/condpoly.htm, Apr. 10, 2000, 5 pages.
"New Multi-Color Polymers May Improve Fighter Jet Canopies", Air Force Research Laboratory, one page.
"Thermochromic & Photochromic Inks", http://www.angelfire.com/biz/thermochromics, Apr. 12, 2000, one page.
"BASF showcases color-changing classic cars at 1999 Woodward Dream Cruise", http://www.basf.com/newsinfo/current/Woodward-DreamCruise.html, Apr. 12, 2000, 3 pages.

* cited by examiner

*Primary Examiner*—Ricardo Osorio
(74) *Attorney, Agent, or Firm*—Roland K. Bowler, II

(57) ABSTRACT

A wireless communication handset (100), or other electrical device, having a housing disposed about electrical communications circuitry. At least a portion of the housing, for example a bezel (144) or keypad area (148) comprising a variable input responsive variable appearance portion, for example an electro-chromic material. A user operable control circuit coupled to the electro-chromic material portion of the housing, whereby a color of the electro-chromic material portion of the housing is variable by the color control circuit.

11 Claims, 3 Drawing Sheets

CELLULAR COMMUNICATION HANDSETS HAVING VARIABLE APPEARANCE HOUSINGS AND METHODS THEREFOR

FIELD OF THE INVENTIONS

The present inventions relate generally to electronics devices, and more particularly to user variable appearance housings for electronics devices, for example cellular handsets, combinations thereof and methods therefor.

BACKGROUND OF THE INVENTIONS

The successful marketing of wireless communication cellular handsets is dependent to some extent on style trends and also on the ability of end-users to customize and personalize their devices, including the outer cosmetic appearance thereof.

Cellular telephone handsets having interchangeable color faceplates and other user interchangeable/configurable postponement parts, for example, have therefore had substantial appeal to consumers and manufactures alike. Interchangeable color faceplates and other housing portions allow users to personalize their handsets, for example, to coordinate with personal apparel, to reflect changes in mood or psychological disposition, to differentiate from the masses, to associate with peers, etc.

The various aspects, features and advantages of the present invention will become more fully apparent to those having ordinary skill in the art upon careful consideration of the following Detailed Description of the Invention with the accompanying drawings described below.

DETAILED DESCRIPTION OF THE INVENTIONS

Figure 1:
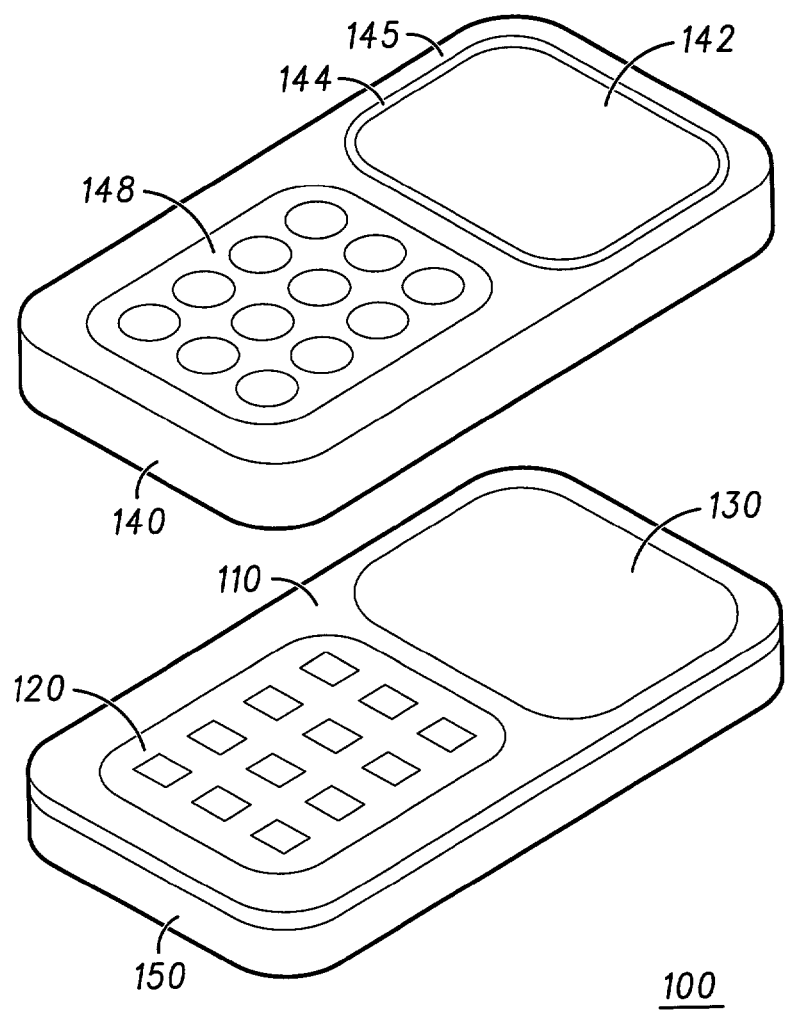
FIG. 1 is a schematic diagram of an exemplary wireless communication handset having a housing with a variable appearance property.

FIG. 1 is an exemplary wireless communication handset 100 comprising generally electrical communications circuitry, which typically comprises integrated and discrete components mounted on a printed circuit board 110 having keypad inputs 120, for example popple domes type inputs, and in some embodiments a display 130.

In the exemplary embodiment, the electrical circuitry is housed at least partially within an outer housing comprising an upper portion 140 and a lower housing portion 150. The exemplary upper housing portion 140 includes a display opening 142 with a display bezel 144 disposed thereabout, and in one embodiment includes defined keypad area 148 within which a plurality of user activated keypad buttons are disposed for actuating the keypad inputs 120 on the printed circuit board 110.

The housing or at least a portion thereof includes a variable cosmetic property portion. In one exemplary embodiment, the housing or portion thereof comprises an electro-chromic material, which changes color as a function of a variable voltage applied thereto.

Figure 2:
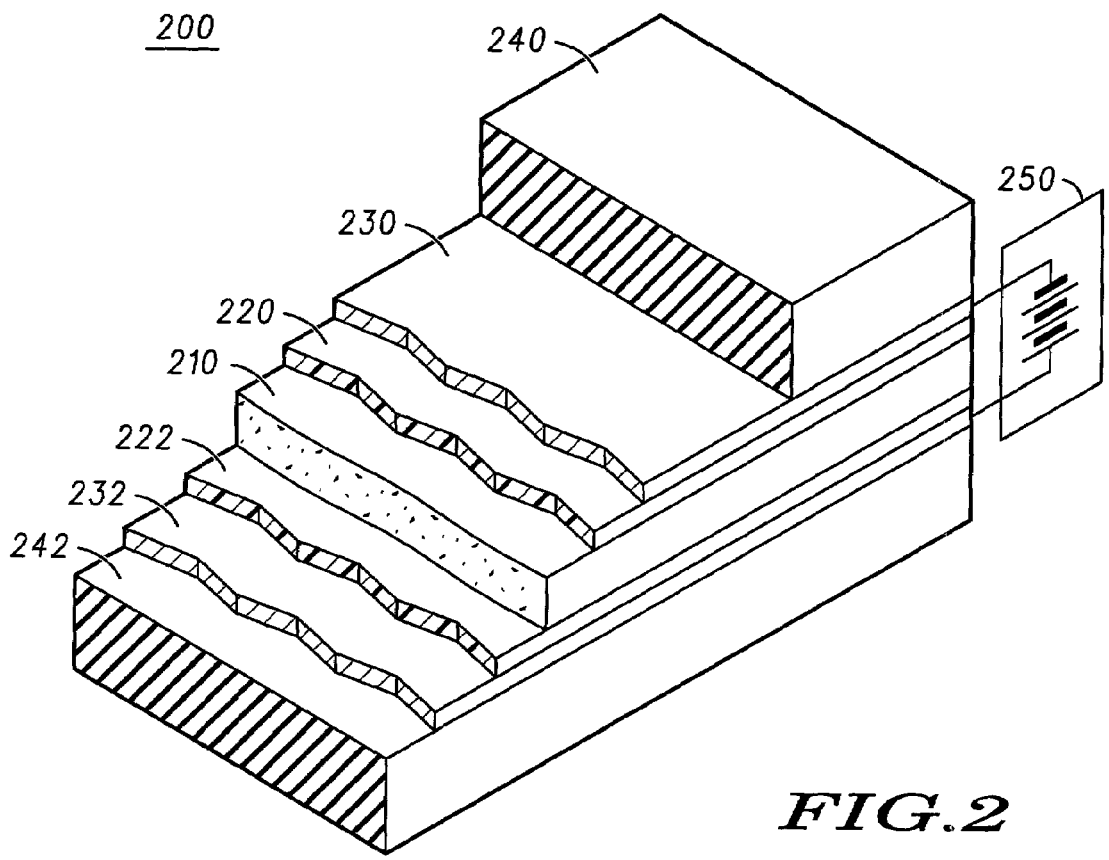
FIG. 2 is a sectional view of an exemplary electro-chromic material.

FIG. 2 illustrates an exemplary electro-chromic material 200 comprising generally a gel electrolyte 210 disposed between upper and lower electro-chromic polymer layers 220 and 222, which are disposed between upper and lower transparent layers 240 and 242. In the exemplary embodiment, variable voltage outputs from a DC voltage source 250 are applied to the transparent conductors 230 and 232.

Figure 3:
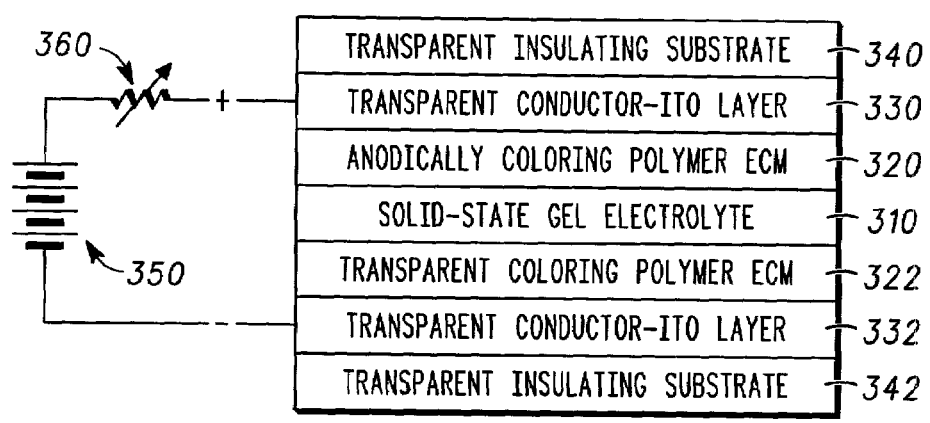
FIG. 3 is a schematic illustration of an electro-chromic material.

In FIG. 3, the exemplary electro-chromic material 300 is an electro-chromic polymer comprises a solid-state gel electrolyte 310, which are disposed between anodically coloring polymer electro-chromic materials 320 and 322, which are disposed between the transparent conductors 330 and 332, which are disposed between transparent insolating substrates 340 and 342. In other embodiments other electo-chromic materials may be used alternatively.

A color control circuit comprising generally a DC voltage source 350 and a variable resistance 360 is coupled to the transparent conductor layers 330 and 332. Other variable electrical sources may be used alternatively, for example variable current sources.

In the exemplary embodiment, the color of the electro-chromic material is altered by varying the voltage applied to the transparent conductor layers thereof. A mechanical potentiometer on the handset or preferably a software controllable input, for example a menu selection in a software configuration mode of the device, permits the user to change the color of the housing by changing the voltage applied thereto.

Figure 4:
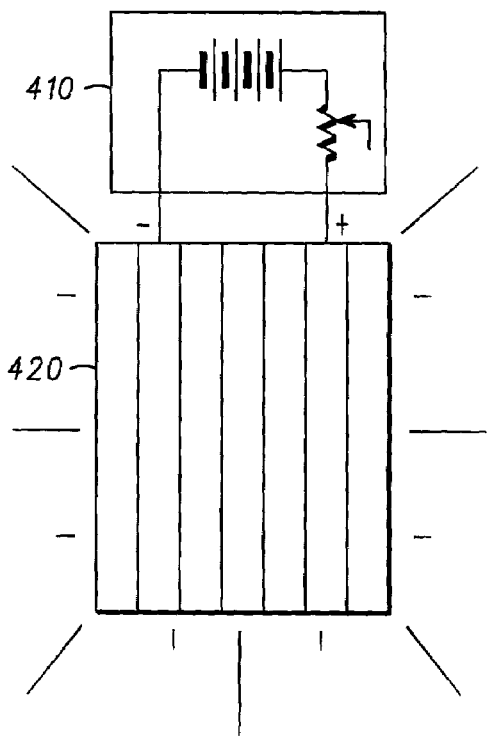
FIG. 4 illustrates a first appearance configuration of a variable appearance housing portion.
Figure 5:
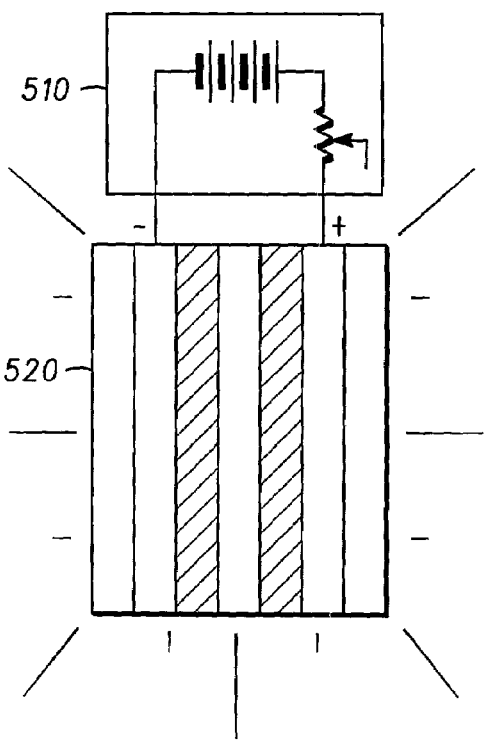
FIG. 5 illustrates a second appearance configuration of a variable appearance housing portion.
Figure 6:
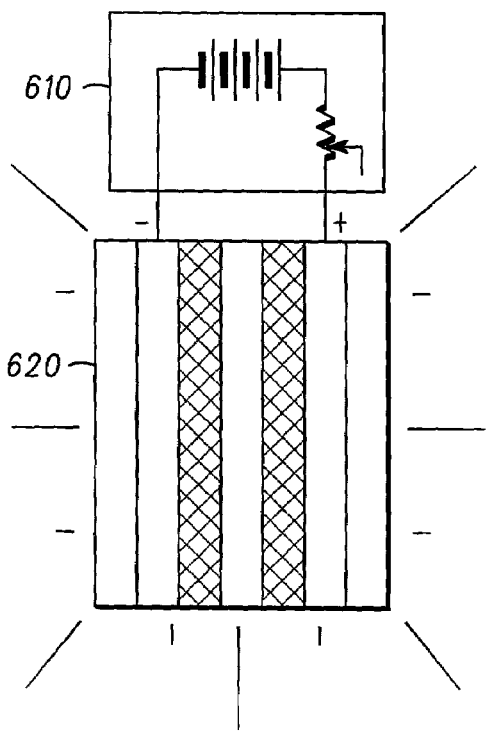
FIG. 6 illustrates a third appearance configuration of a variable appearance housing portion.
Figure 7:
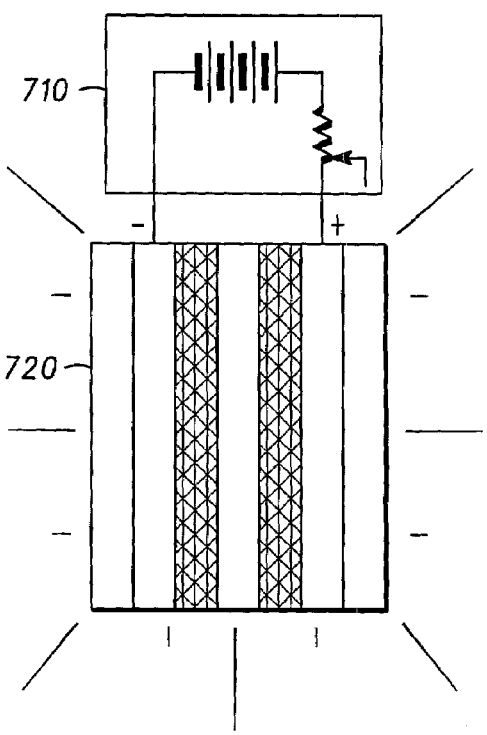
FIG. 7 illustrates a fourth appearance configuration of a variable appearance housing portion.

In FIG. 4, the voltage of the control circuit 410, as set by the variable resistance, produces a first color appearance, which corresponds to a first color of the housing portion 420. In FIG. 5, the voltage of the control circuit 510 produces a second color appearance, which corresponds to a second color of the housing portion 520. In FIG. 6, the voltage of the control circuit 610 produces a third color appearance, which corresponds to a third color of the housing portion 620. And in FIG. 7, the voltage of the control circuit 710 produces a fourth color appearance, which corresponds to a fourth color of the housing portion 720. In FIGS. 4–7, the different colors of the housings or housing portions 420, 520, 620 and 720 are indicated by the different hatchings on the sectional portions thereof.

In other embodiments, the variable input responsive variable appearance portion of the housing is a material other than a color variable electro-chromic polymer material, whereby the variable input responsive variable appearance portion of the housing changes appearance in response to some variable input other than a variable voltage.

In one embodiment, for example, the variable input responsive variable appearance portion of the housing is a photochromic material that changes appearance in response to variations in sunlight. In another alternative embodiment, the variable input responsive variable appearance portion of the housing is a thermo-chromic material that changes appearance in response to variations in temperature, for example, the thermal input from the users hand contacting the housing. In yet another alternative embodiment, the variable input responsive variable appearance portion of the housing is a gonio-chromic material that changes appearance in response to variations in the angle of reflected light. The housing or portions thereof may also comprise combinations of these and other materials, including variable color electro-chromic materials discussed above.

Figure 8:
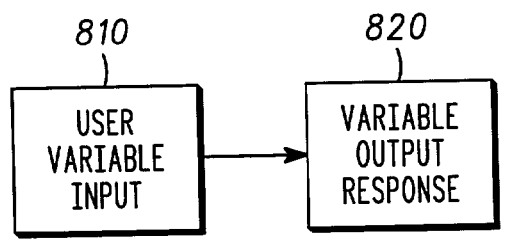
FIG. 8 is a process flow implementation of the invention on a wireless communication handset or other electrical device.

The invention is implemented in a wireless communications handset, or more generally in any electrical device, having an outer housing with a variable cosmetic property as discussed above. In FIG. 8, in block 810, the user of the cellular telephone handset or other electrical device provides a variable input thereto, for example, by selecting a variable voltage, or by applying body heat to the device, or by exposing the deice to sunlight or other incident light.

At block 820, a variable appearance property of the housing is varied in response to the user variable input applied to the device at block 810. In the exemplary embodiment, the user variable input is provided by selecting a voltage applied by an electrical control circuit having a variable voltage output coupled to an electro-chromic portion of the housing, varying the variable appearance property by changing a color of the electro-chromic portion of the housing in response to a variable voltage applied thereto.

In one embodiment, substantially the entire housing is formed of a variable input responsive variable appearance material, in other embodiments only portion of the housing are formed of such a material. In FIG. 1, for example, the upper housing 140, or a faceplate portion thereof 145, may comprises an electro-chromic material. Alternatively, only the display bezel portion 144 of the housing, or only the keypad area 148, or combinations thereof comprise the electro-chromic material. Thus the housing or housing portion may comprise a polymer or plastic housing portion having a variable input responsive variable appearance material portion, for example the faceplate or the bezel or the keypad area. Alternatively, the entire housing of housing portion may be of a variable input responsive variable appearance material.

While the present inventions and what is considered presently to be the best modes thereof have been described in a manner that establishes possession thereof by the inventors and that enables those of ordinary skill in the art to make and use the inventions, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. An electronic device, comprising:
   electrical hardware;
   a housing disposed about at least a portion of the electrical hardware,
   at least a portion of the housing comprising a variable input responsive variable appearance portion,
   a control circuit having a user variable output coupled to the variable input responsive variable appearance portion of the housing,
   whereby the variable input responsive variable appearance portion of the housing changes appearance in response to the user variable output of the control circuit.

2. The electronic device of claim 1, the variable input responsive variable appearance portion of the housing is a light emitting polymer material.

3. The electronic device of claim 1, the variable input responsive variable appearance portion of the housing is an electro-chromic material, the control circuit having a variable voltage output coupled across the electro-chromic material.

4. The electronic device of claim 3, the electro-chromic material is an electro-chromic polymer.

5. The electronic device of claim 3, the electro-chromic material includes an anodically coloring polymer layer and a cathodically coloring layer separated by a solid-state gel electrolyte layer, the anodically and cathodically coloring layers disposed between first and second transparent conducting layers.

6. The electronic device of claim 5, the electro-chromic material includes first and second transparent insulating layers, the first and second transparent conducting layers disposed between the first and second insulating layers.

7. The electronic device of claim 5, the control circuit having a first output coupled to the first transparent conducting layer, the control circuit having a second output coupled to the second transparent conducting layer by a variable resistance element.

8. The electronic device of claim 1, the electro-chromic material includes an anodically coloring polymer layer and a cathodically coloring layer separated by a solid-state gel electrolyte layer, the anodically and cathodically coloring layers disposed between first and second transparent conducting layers.

9. A method in a wireless communications handset having an outer housing with a variable input responsive variable appearance property portion, comprising:
   providing a user variable input to the wireless communication handset;
   varying a variable appearance property of the variable input responsive variable appearance property portion of the housing in response to the user variable input applied to the wireless communication handset.

10. The method of claim 9, providing the user variable input by selecting a voltage applied by an electrical control circuit having a variable voltage output coupled to an electro-chromic portion of the housing.

11. The method of claim 9, varying the variable appearance property by changing a color of the electro-chromic portion of the housing in response to a variable voltage applied thereto.

* * * * *